(12) United States Patent
Horn et al.

(10) Patent No.: US 11,924,002 B2
(45) Date of Patent: Mar. 5, 2024

(54) SMART ENERGY HUB

(71) Applicant: Solaredge Technologies Ltd., Herzeliya (IL)

(72) Inventors: Julie Horn, Tel Aviv (IL); Frank Bakker, Tel Aviv (IL); Ofir Appelbaum, Givat Shmuel (IL); Yossi Yacov, Kfar Sava (IL); Shabtai Atlow, Efrat (IL)

(73) Assignee: Solaredge Technologies Ltd., Herzeliya (IL)

( * ) Notice: Subject to any disclaimer, the term of this patent is extended or adjusted under 35 U.S.C. 154(b) by 89 days.

(21) Appl. No.: 17/363,838

(22) Filed: Jun. 30, 2021

(65) Prior Publication Data

US 2021/0409238 A1 Dec. 30, 2021

Related U.S. Application Data

(60) Provisional application No. 63/045,962, filed on Jun. 30, 2020.

(51) Int. Cl.
*H04L 12/28* (2006.01)
*B60L 53/30* (2019.01)
*G06Q 50/06* (2012.01)

(52) U.S. Cl.
CPC .......... *H04L 12/283* (2013.01); *B60L 53/305* (2019.02); *G06Q 50/06* (2013.01); *H04L 2012/2841* (2013.01); *H04L 2012/285* (2013.01)

(58) Field of Classification Search
CPC ........... H04L 12/283; H04L 2012/2841; H04L 2012/285; B60L 53/305; G06Q 50/06; Y02B 70/30; Y02B 70/3225; Y02E 10/56; Y02E 60/00; H02J 13/00002; H02J 2310/56; H02J 3/14; H02J 3/381; H02J 3/32; H02J 13/00028; H02J 13/00032; H02J 2300/24; Y02T 10/70; Y02T 10/7072; Y02T 90/12; Y02T 90/16; Y04S 10/30;

(Continued)

(56) References Cited

U.S. PATENT DOCUMENTS

2006/0276938 A1 12/2006 Miller
2015/0061387 A1* 3/2015 Daniel .................... H02S 10/12
                                                    307/24
2020/0059098 A1 2/2020 Dong et al.

FOREIGN PATENT DOCUMENTS

EP   3742569 A1   11/2020
WO   2010029315 A2   3/2010

OTHER PUBLICATIONS

Nov. 14, 2022—EP Office Action—EP App. No. 21182067.5.
Nov. 16, 2021—European Search Report—App No. 21182067.5.

* cited by examiner

*Primary Examiner* — Tejal Gami
(74) *Attorney, Agent, or Firm* — Banner & Witcoff, Ltd.

(57) ABSTRACT

Systems, apparatuses, and methods are described for a smart energy home. The smart energy home may promote optimization of consumption of electricity by appliances and other consumer devices. Prioritization of where and when electricity may be provided to various appliances, chargers, or other devices which draw electrical power may be managed by the smart energy home. Information concerning prevailing weather conditions and contemporaneous electrical tariffs may be utilized in processes executed by the smart energy home. Related systems, apparatuses, and methods are also described.

20 Claims, 3 Drawing Sheets

(58) Field of Classification Search
CPC ...... Y04S 20/20; Y04S 20/222; Y04S 20/242; Y04S 20/244; F24H 9/2014
See application file for complete search history.

SMART ENERGY HUB

CROSS REFERENCE TO RELATED APPLICATIONS

This application claims the benefit of U.S. Provisional Patent Application No. 63/045,962, filed Jun. 30, 2020. The contents of the above identified application are incorporated herein by reference in its entirety.

BACKGROUND

A home that connects different appliances via a communication network and allows them to be remotely controlled, monitored, and accessed may be considered a 'smart home'. A 'smart energy home' may provide for domestic electrical needs (such as a demand for electric power by home appliances) using both an electric grid and any available electrical energy generated at the home, such as by photovoltaic (PV) panels on the roof of the smart energy home. The smart energy home may also have at least some properties of a smart home. A smart home hub is hardware or software or a combination of both hardware and software that connects devices on a home automation network and controls communications among them. Smart home hubs, which connect either locally or to the cloud, may interact with internet of things (IoT) devices.

SUMMARY

The following summary presents a simplified summary of certain features. The summary is not an extensive overview and is not intended to identify key or critical elements.

A smart energy hub may be disposed in an inverter in the smart energy home. At one terminal, the smart energy hub may be connected to one or more power sources including, but not limited to, a plurality of photovoltaic (PV) panels that are electrically connected to the inverter. The inverter converts direct current (DC) electricity from the PV panels to alternating current (AC) electricity. At a second terminal, the smart energy hub may be connected to one or more smart energy devices. The smart energy hub comprises one or more processors for executing instructions, where the instructions (when executed on the processor) configure the processor to determine an amount of AC electricity supplied from an electric grid to the one or more smart energy devices. The instructions also configure the processor to control an amount of AC electricity supplied to the one or more smart energy devices from the invertor.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
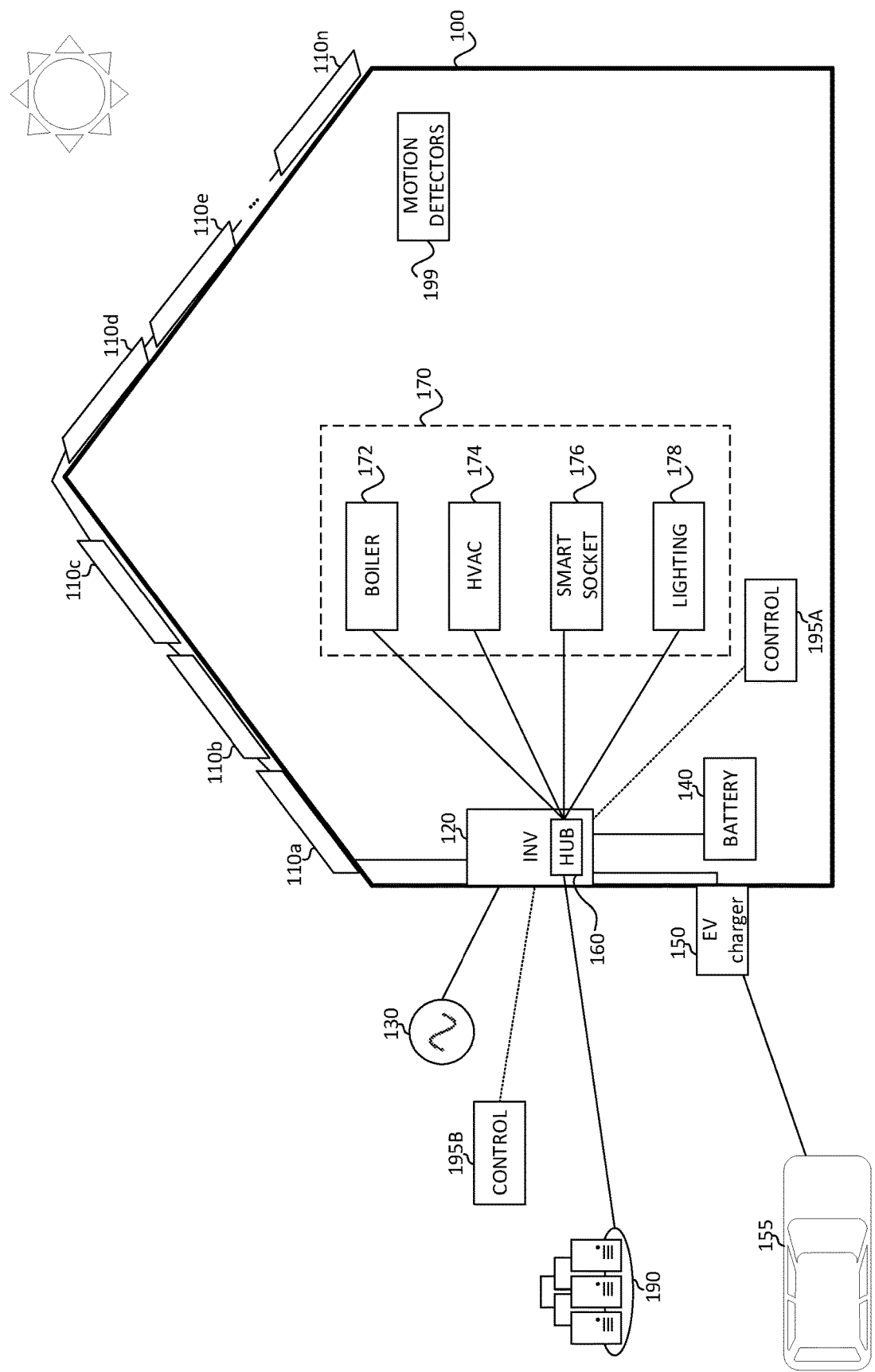
FIG. 1 shows an example of a smart energy home.

The accompanying drawings, which form a part hereof, show examples of the disclosure. It is to be understood that the examples shown in the drawings and/or discussed herein are non-exclusive and that there are other examples of how the disclosure may be practiced.

Reference is now made to FIG. 1, which shows a first example of a smart energy home 100. While the home is depicted as a personal dwelling, the smart energy home 100 may represent any building with a smart energy system (e.g., a workplace). The smart energy home 100 may comprise a plurality of photovoltaic (PV) panels 110a-110n, which may capture solar energy. The solar energy may be converted to DC electricity by the plurality of PV panels 110a-110n. The DC electricity in turn is provided to an inverter 120 by the plurality of PV panels 110a-110n (wherein 'n' could represent any number of panels). The inverter 120 converts the DC electricity provided by the plurality of PV panels 110a-110n into AC electricity, which is then provided to an AC electric grid 130, which may, by way of example, be a municipal or regional electrical grid. The AC electric grid 130 may provide electricity to the smart energy home 100 (e.g., as electricity is needed for home appliances). For example, if the demand for electricity in the smart energy home 100 exceeds production by the PV panels 110a-110n, the AC electric grid 130 may then be utilized to provide (e.g., provide supplemental) electricity to the smart energy home 100.

The PV panels 110a-110n are shown by way of example, and the smart energy home 100 may comprise one or more energy sources in addition to or instead of the plurality of PV panels 110a-110n and the inverter 120. Other alternative energy sources may include, but are not limited to, systems utilizing wave energy, biofuels, geothermal power, wind energy, tidal energy, and so forth.

The inverter 120 may be connected to a battery 140. The battery 140 may provide storage capacity for storing DC electricity, which may be used by the smart energy home upon demand (e.g., at times when there is a power failure and no electricity is provided by the AC electric grid 130). The battery 140 may also provide electricity at night (or other periods when power produced at the home is limited, such as a PV panel's production during particularly cloudy periods of time) when the plurality of PV panels 110a-110n is not producing DC electricity.

The inverter 120 may be connected to an electric vehicle (EV) charger 150 which may provide electricity to an EV 155. The EV 155 may be battery powered. The EV charger 150 may provide a convenient interface for charging an EV vehicle battery (which is typically not the same as the battery 140 described above).

The inverter 120 may comprise a smart energy home hub 160. A smart energy home hub 160 may comprise hardware, software, or a combination of both hardware and software, and may connect devices on a smart energy home 100 network and control communications among them. In some examples, the smart energy home hub 160 may comprise dedicated hardware in the inverter 120. In other examples, the smart energy home hub 160 may be implemented at least in part in software running in said hardware in the inverter 120. The smart energy home hub 160 may comprise a smart home hub for networking between, controlling, or connecting some or all smart devices (e.g., smart energy home devices 170), such as devices which may not be smart energy home devices 170 in the smart energy home 100. By way of example, the smart energy home hub 160 may control a coffee maker over the smart energy home network, but the coffee maker itself may not be a smart energy home device 170. Details concerning smart energy home devices are provided below.

The smart energy home hub 160 may comprise hardware that is independent of the inverter 120. In such a case, the smart energy home hub 160 may be disposed at any location within the smart energy home 100. For example, a home that does not comprise the plurality of PV panels 110a-110n and the inverter 120 may also have a smart energy home hub 160 and utilize features described herein of the smart energy home that are not dependent on the presence of the plurality of PV panels 110a-110n and the inverter 120.

The smart energy home hub 160 together with the other connected elements (e.g., the EV charger 150) may be considered a smart energy home network. The smart energy home network may comprise a network (e.g., a local area network or 'LAN') over which sensors and various smart energy home devices and other devices may be interconnected. The smart energy home network may be monitored, controlled, or accessed by its users. The smart energy home network may provide services that respond to the perceived needs of the users, such as may be described herein below.

As noted above, the smart energy home hub 160 may provide a central control of a network between some or all smart energy home devices 170. Such smart energy home devices 170 may be nodes on the smart energy home network. Smart energy home devices may include, but are not limited to, a water boiler 172; a heating, ventilation, and air conditioning (HVAC) unit 174; a smart socket 176; or home lighting and lighting control 178. Other devices may be smart devices and may also comprise nodes on the smart energy home network. Such smart devices may receive electric power either from a smart socket (such as the smart socket 176) or from a non-smart electrical socket.

Network communications over the smart energy home network may be via the smart energy home hub 160. In some instances, one or more of smart energy home devices 170 may communicate directly with at least one other of the smart energy home devices 170, where the path of the communication over the smart energy home device may not include the smart energy home hub 160. The smart energy home hub network may have an appropriate network topology, including, but not limited to: point-to-point topology; daisy chain topology; bus topology; star topology; ring topology; mesh topology; hybrid topologies, or so forth. Additionally, at least one smart energy home devices 170 may function as, and/or include, a smart energy network range extender, a smart energy network range booster, or a smart energy network repeater.

Dedicated network devices may be added to the smart energy network, and may provide functionality similar to or corresponding to networking services and functionality provided by networking devices in communication networks. By way of a non-limiting example, the smart energy home hub 160, the inverter 150 or another smart energy network device 170 may function as a protocol converter between a first device, which may communicate using a first protocol, and a second device, which may communicate using a second protocol. For example, if the first smart energy network device may communicate via WiFi and RS485, and the second smart energy network device may communicate via ZigBee and Bluetooth, the smart energy home hub 160, the inverter 150 or the other smart energy network device 170 may function to provide protocol conversion services between the first smart energy network device and the second smart energy network device.

The smart energy home hub 160 may communicate (e.g., send and receive data) with servers 190 disposed outside of the smart home 100 networking environment. As an example, the smart energy home hub 160 may receive information from the servers 190 pertaining to weather conditions that may affect the generation of power. The weather condition information may be used by the smart energy home hub 160 in regulating the power to, or operation of, at least some of the smart energy home devices 170, such as may be explained below.

By way of another example, the smart energy home hub 160 may receive information from the servers 190 pertaining to contemporaneous or anticipated electricity tariffs. The smart energy home hub 160 when regulating at least some of the smart energy home electricity use, may use information received regarding anticipated electricity tariffs. For example, the smart energy home hub 160 may provide electricity to the grid at a time of peak payment for generated electricity, or by using generated solar electricity in the smart energy home 100 or for charging the battery 140 at times when the purchase cost of grid provided electricity is high.

The smart energy home hub 160 may communicate with the smart energy home devices 170 using a wireless communication protocol. The smart energy home hub 160 may communicate with the smart energy home devices 170 using a wired communication protocol. Some smart energy home devices 170 on the smart energy network may communicate with the smart energy home hub 160 using a wireless communication protocol and other smart energy home devices 170 on the smart energy network may communicate with the smart energy home hub 160 using a wired communication protocol. Communication between the smart energy home hub 160 and at least some of the smart energy home devices 170 may be encrypted. Encryption may be, for example, via a symmetric encryption algorithm (e.g., Blowfish, AES, DES, 3-DES, etc.) following an initialization procedure. Encryption may be performed using an asymmetric encryption scheme rather than a symmetric encryption algorithm (e.g., Elliptic Curve Cryptography (ECC), RSA, ElGamal, etc.) following an exchange of keys (for example, using the Diffie-Hellman key exchange protocol) during the initialization procedure (described below, with reference to FIG. 2). In some cases, certificates may be exchanged between the smart energy home hub 160 and the smart energy home devices 170, each certificate having its respective device's public key. Once certificate exchange has been executed between the smart energy home hub 160 and one of the smart energy home devices 170, the public keys comprised in the certificates may be used for encrypting communications between the smart energy home hub 160 and the one of the smart energy home devices 170.

A controller, such as local controller 195A or a remote controller 195B, may control the smart energy home hub 160. For example, there may be a dedicated console in contact (directly, in a wired fashion, or over a wireless network, for instance) with the smart energy home hub 160. The local controller 195A may be run as an application on the smart energy home hub 160 itself, the invertor 120, or on an associated smart energy home control panel (e.g., local controller 195A). The local controller 195A be run as an application on one or more other appropriate locations disposed in the smart energy home 100. The remote controller 195B may be implemented for example, as an application on one or more of a smart phone, a tablet, a laptop computer, or other appropriate device, which a resident of the smart energy home 100 may carry with himself or herself.

Communications between the smart energy home hub 160 and the local controller 195A or the remote controller 195B may also be encrypted (e.g., using keys generated and shared as described above, or using an encryption method as described above).

The local controller 195A or the remote controller 195B may enable a user of the smart energy home hub 160, (who may, for example, be a resident of the smart energy home 100) to manage the devices which may be controlled by the smart energy home hub 160. Control of the smart energy home hub 160 may switch seamlessly between the local controller 195A and the remote controller 195B, or different instantiations of the local controller 195A or the remote controller 195B. For example, the user of the smart energy home hub 160 may be associated with at least one personal device (which may also function as the remote controller 195B) that may be carried by the user of the smart energy home hub 160 most of the time (for instance, one of a smart phone, a transponder key, or fob). The personal device may function as a beacon, signaling the presence of the user of the smart energy home hub 160. For example, if the beacon signal is detected on a local area network (LAN), the user associated with that particular beacon will be considered 'present'. If the beacon signal is detected on a different segment of a wide area network (WAN) than a local LAN, then the user associated with that particular beacon will be considered 'remote'. Similarly, if the beacon is not detected by the smart energy home hub 160, the user associated with the at least one personal device is considered by the smart energy home hub 160 to be using a remote controller 195B. If the beacon is detected by the smart energy home hub 160, the user associated with the at least one personal device is considered by the smart energy home hub 160 to be using a local controller 195A. In a home environment, the whole home may have one LAN, and if the particular user's device is connected directly to the LAN, then the associated particular user is considered to be within the local domain of the smart energy home hub 160.

By way of an example, HVAC unit 174, which may be used, e.g., for maintaining the smart energy home 100 ambient temperature at a comfortable level for its occupants, may be adjusted or controlled using the smart energy home hub 160 via the local controller 195A or the remote controller 195B. The water boiler 172, which may be used for heating water for use in the smart energy home 100, may be adjusted or controlled via the local controller 195A or the remote controller 195B. For example, if a resident of the smart energy home 100 unexpectedly needs to go home early, he or she is able to control the HVAC unit 174 to warm up or cool down (e.g., depending on the season) the smart energy home 100. In another example, the resident of the smart energy home 100 may be delayed or even prevented from getting home (e.g., in the event of an unexpected storm), and the water boiler 172 may have been set to heat water so that there may be water ready for showers by a certain time. Using the remote controller 195B, the resident of the smart energy home 100 may cancel or defer the heating of water. Using a smart algorithm, the hub may anticipate a late arrival and lower a water-heating rate to the limit of the power generation system, such as between 100 and 10,000 watts. The HVAC unit 174 may comprise some components that include a heat pump or are operated by heat pump technology.

In addition, the HVAC unit 174 and the water boiler 172 may be used in the smart energy home 100 as a thermal energy storage device. By way of example, water in the water boiler may be heated at a time earlier than may otherwise be required by anticipating when the heated water might be needed. However, there may be other reasons (anticipated demand for electricity, anticipated increase or decrease in the price of electricity, etc.) which may justify storing hot water in the water boiler 172. Similarly, the house temperature may be raised or lowered by a degree or two when no one is in the house, in order to store the energy required to heat/cool the house by raising the ambient temperature. The house may be cooled or heated later to compensate for this varying the house temperature.

The water boiler 172 may itself comprise a smart appliance. Specifically, the water boiler 172 may comprise one terminal connected to one or more power sources, including the inverter 120 (i.e., the water boiler 172 may be powered by the plurality of PV panels 110a-110n via the inverter 120). The water boiler 172 may further comprise one or more processors and memory which stores instructions, which upon execution by the processor may determine a first amount of AC electricity supplied from an electric grid, to the boiler, and to control a second amount of AC electricity supplied, from the inverter, to the water boiler 172. The water boiler 172 may further comprise a communications interface enabling it to communicate with any one or all of the one of the smart energy home devices 170 as well as the smart energy home hub 160.

The HVAC unit 174 may itself comprise a smart appliance. Specifically, the HVAC unit 174 may comprise one terminal connected to one or more power sources, including the inverter 120 (i.e., the HVAC unit 174 may be powered by the plurality of PV panels 110a-110n via the inverter 120). The HVAC unit 174 may further comprise one or more processors and memory which stores instructions, which upon execution by the processor may determine a first amount of AC electricity supplied from an electric grid, to the HVAC unit 174, and to control a second amount of AC electricity supplied, from the inverter, to the HVAC unit 174. The HVAC unit 174 may further comprise a communications interface enabling it to communicate with any one or all of the one of the smart energy home devices 170 as well as the smart energy home hub 160.

The smart energy home hub 160 may provide a method and system to maximize self-consumption. That is to say, the smart energy home hub 160 may determine or receive information regarding the value of produced energy versus consumed energy, so that the battery 140 is appropriately charged and discharged to meet consumption needs. For example, the smart energy home hub 160 may receive consumption reports from any one or all of the one of the smart energy home devices 170 and determine overall electrical power consumption by summing consumption reported by the smart energy home devices 170.

In some instances (e.g., when there is no plurality of PV panels 110a-110n and no inverter 120 in the smart energy home 100), the HVAC unit 174 and the water boiler 172 may be controlled as described above in the event a late or early arrival of a resident to the smart energy home 100. In some instances, the inverter 120 may be in an inoperable state. In such as case, even if the smart energy home hub 160 is physically located in the inverter 120 the smart energy home hub 160 may still be operational. The smart energy home 100 may be able to act as part of a microgrid, where the microgrid is self-sufficient most of the time, only to connect to the grid in certain circumstances.

The smart energy home hub 160 may control the smart socket 176 or the home lighting and lighting control 178. The smart socket 176 may comprise an adapter that plugs into a traditional electrical outlet and integrates a smart socket 176 into the smart energy home network, allowing control of the smart socket 176 via the smart energy home hub 160. Such control may be possible using one or both of the local controller 195A or the remote controller 195B. Appliances, such as a washer and dryer, an electric oven, a dishwasher, television sets, DVD players, set-top boxes, computers, etc. (e.g., which may not be smart energy home network enabled, but receive power via one of the smart sockets 176 in the smart energy home 100), may also be controlled via the smart energy home hub 160, such as by using one of the local controller 195A or the remote controller 195B.

One or both of the local controller 195A or the remote controller 195B may enable a user of the controller to set the smart energy home hub 160 to 'vacation mode'. In vacation mode, at least some non-essential devices (such as, but not limited to the smart energy home devices 170) may be turned off by the smart energy home hub 160. Essential devices may include surveillance cameras, security alarms, or so forth, and the essential devices may be kept on by the smart energy home hub 160. The user may use one or both of the local controller 195A or the remote controller 195B to deactivate vacation mode, thereby reactivating by the smart energy home hub 160 non-essential devices which were turned off when entering vacation mode. Some devices may be configured by default to be one of either an essential device or a non-essential device. In some cases, the user may configure the device as essential or non-essential during device setup, or the configuration may be modified later.

More than one resident of the smart energy home 100 may have their own instance of a controller (such as remote controller 195B). Each user may have a profile allowing them to control different appliances and/or different portions of the smart energy home 100. Each child resident in the smart energy home 100 may be allowed control over their own bedrooms and some shared rooms in the smart energy home 100. Parents may have control over a full range of control options provided by the smart energy home hub 160. Profiles may be prioritized, so that a command issuing from a first profile may overrule a command that issues from a second profile. A parent may set up a profile for each one or more of his or her children who reside in the smart energy home 100, defining a profile of each child so as to give that child rights to control smart energy home devices 170 in their own environment, thereby creating a personalized "zone of control". For example, the child may be entitled to control lights, smart sockets, to set a preferred ambient temperature, or so forth for the child's own zone of control. The parent may then define their own profile as a 'super-user' profile, and maintain rights to control all of the smart energy home devices 170 in the smart energy home 100.

The smart energy home hub 160 may detect when a device used as controller is present or absent from the home, (e.g., when a particular user's control of at least one of the of smart energy home devices 170 switches from control via a local controller 195A to control via a remote controller 195B).

If there are no other local controllers 195A present in the smart energy home 100, the smart energy home hub 160 may then turn off lights, turn off the HVAC unit 174, and (e.g., depending on how each one of the smart sockets 176 are configured) may turn off one or more of the smart sockets 176 (thereby also turning off their associated device). Each user profile may have particular configurations regarding which of the smart energy home devices 170 may be turned on or off by the smart energy home hub 160. For example, each user's profile may be configured such that they are associated with a particular set of smart energy home devices 170 (e.g., the smart energy home devices 170 in their bedroom) which are turned off by the smart energy home hub 160 upon their departure from the smart energy home 100 (such as may be indicated by the departure of the remote controller 195B of the particular user from the home, as may be discussed below). When a remote controller 195B associated with a particular user switches from remote network contact with the smart energy home hub 160 to local network contact with the smart energy home hub 160, the particular set of smart energy home devices 170 with which their user's profile is associated may be activated.

In an example, three parties, John (father), Jane (mother), and Joe (teenage son), live in the smart energy home 100. In the example, when John leaves the smart energy home 100, since he and Jane share a bedroom, the lights 178 in their bedroom may not be turned off by the smart energy home hub 160. However, the lights 178 in John's study may be turned off by the smart energy home hub 160. When Jane leaves the smart energy home 100 after John has already left, however, the lights 178 in their bedroom may be turned off by the smart energy home hub 160. When Joe leaves the house, after Jane, the lights 178 in his bedroom turn off by the smart energy home hub 160, as well as the lights 178 in common areas. Since there are no remote controllers 195B present in the house smart energy home 100 at this point, the lights 178 in common areas (kitchen, dining area, etc.), the HVAC unit 174, and so forth may all be turned off by the smart energy home hub 160. The smart socket 176 to which a coffee machine is connected may also be turned off by the smart energy home hub 160. Because the heating of water is a domestic function which needs to be completed by a certain time (e.g., before the morning or evening showers begin), the boiler 172 may be unaffected by the comings or goings of the residents of the smart energy home 100. A similar procedure may be followed in reverse, turning on the various smart energy home devices 170 by the smart energy home hub 160 as the residents of the smart energy home 100 begin to return to the smart energy home 100.

As may be described above, the controller (which may be either one or both of the local controller 195A or the remote controller 195B) associated with the particular user may define the presence or absence of the particular user for the smart energy home hub 160. In cases where one user forgets or loses the controller (local 195A or remote 195B) with which they are associated, the user may override the effect caused by their distancing from their controller. In such a case, an interface to the smart energy home devices 170 may be accessed, for example, over the Internet, by providing a user name and password. In the event the particular user changes their local controller device (e.g., they purchase a smart phone), there may be a process to create a local controller on a new device. Similarly, there may be a process to deactivate the local controller on a device. In the event of a lost device, the deactivation of the local controller may be performed remotely, for example over the Internet by providing a user name and password.

There may also be motion detectors 199 present in some rooms in the house which may be configured to determine if there is motion, and then (e.g., after a timeout) the lights 178, particular smart sockets 176, or the HVAC unit for that room may be turned off by the smart energy home hub 160. For example, if Jane falls asleep without turning out the lights 178 in her bedroom, then after fifteen minutes with no motion in the bedroom, the smart energy home hub 160 may turn off the bedroom lights 178. In another example, if Joe does not switch off the lights in the bathroom after bathing, then when no motion is detected after 10 minutes, the smart energy home hub 160 may turn off the bathroom lights 178.

The motion detectors 199 may be used by the smart energy home hub 160 as a burglar alarm. For example, if none of the remote controller devices 195B are present in the smart energy home 100, and motion is detected, a warning could be sent to one or more of the residents of the smart energy home 100, or the police or a security company may be notified. The motion detectors 199 may be set to compensate for the presence of pets, such as the family dog or cat. Accordingly, the motion detectors 199 may comprise passive infrared detectors, which detect changes in heat and movement in the sensor's coverage area. When there is motion in a field of view of the sensor, the sensor may detect a triggering heat signature, or determine if the heat signature is over a particular range (i.e., a threshold greater than that expected to be generated by the family dog or cat) or not. If the heat signature exceeds the permissible range, an alarm may be triggered.

It is also appreciated that the motion detectors 199 may themselves also be temperature sensors. Alternatively, the motion detectors 199 may themselves not comprise temperature sensors, but rather, additional sensors comprising the temperature sensors may be present in the smart energy home 100 (and may be in communication with the smart energy home hub 160). For example, the additional sensors may additionally or independently comprise lighting sensors. Accordingly, the smart energy home hub 160 may control (e.g., turn on and off) lights 178 in response to information provided by the lighting sensors.

The smart energy home hub 160 may be configured, over time, to learn behavior or consumption patterns of a particular resident or residents of the smart energy home 100. For example, if John, Jane, or Joe, typically begin their day no later than 7:00 AM and end their day no later than 11:00 PM, the smart energy home hub 160 may gradually come to learn when is the best time (in view of user behavior, electricity prices and weather conditions received from the server 190, etc.) to run the boiler 172, turn on and off the HVAC unit 174, turn on and off lights 178, etc. For example, if the smart energy home hub 160 detects that John's controller switches from being outside the smart energy home hub network to being inside the smart energy home hub network every weekday between 5:00 PM-5:30 PM, the smart energy home hub 160 may turn on the lights in John's study every weekday at 4:45 PM.

The smart energy home hub 160 may comprise an interface to a native smart energy home hub 160 voice interface, or may be operable, via appropriate interfaces using commercially available voice assistants. By way of example, a voice assistant may be provided or may be available as an accessory of the smart energy home hub 160. For the sake of this example, the native voice assistant may be referred to as "Hal". One resident of the smart energy may then orally issue a command to the smart energy home hub 160 by saying, "Hal, have water heated for baths tonight at seven". In another example, the resident of the smart energy home may orally instruct, "Hal, I am leaving for work now. Turn off the air conditioner, and restart it again at five." The smart energy home hub 160 voice interface may also perform voice recognition. In the previous example, when the resident of the smart energy home orally instructs, "Hal, I am leaving for work now. Turn off the air conditioner, and restart it again at five," the smart energy home hub 160 voice interface may reply, on the basis of voice recognition, "Yes Jane" or some similar response, assuming that the instruction was said by Jane. The smart energy home hub 160 may determine, on the basis of voice recognition that a resident of the smart energy home 100 who declares that he or she is leaving the smart energy home 100, that the resident is no longer present (possibly after some pre-set delay, e.g., 5 or 10 minutes). Similarly, if the voice detection system of the smart energy home hub 160 (e.g., the voice assistant) detects a resident of the smart energy home 100 speaking, e.g., to another person, on the telephone, etc., then the smart energy home hub 160 may determine that the speaker is present in the smart energy home 100.

The smart energy home hub 160 voice interface may also perform text-to-speech analysis with an appropriate text-to-speech software module which may run on the smart energy home hub 160 or another location, such as a tablet or smart phone application, for example, in an application. By way of example, if a 5 year old child asks, "Hal, when will Daddy be home", aside from answering the question (if an answer is available), the smart energy home hub 160 may store the information that an occupant of the smart energy home 100 defined as being "Daddy" with respect to the 5 year old child is not presently at home.

As discussed above regarding FIG. 1, the inverter 120 may also be connected to the EV charger 150. The smart home energy hub 160 may therefore be used to exercise control over the EV charger 150. For example, as was noted above, the smart home energy hub 160 may receive information regarding contemporaneous or upcoming anticipated electricity tariffs. The smart home energy hub 160 may use such information to determine one or more optimum time for operating or disconnecting the EV charger 150.

As discussed above regarding FIG. 1, the smart home energy hub 160 may receive weather information that is pertinent to contemporaneous or upcoming anticipated weather conditions from the server 190. The smart energy home hub 160 may use the weather information in regulating at least some of the smart energy home devices 170. For example, based on received weather information, the smart energy home hub 160 may activate or deactivate the HVAC unit 174, possibly on a per room basis. In another example, on the basis of received weather information, the smart energy home hub 160 may activate or deactivate the water boiler 172, or may activate the water boiler 172 for a longer or shorter amount of time (e.g., there may be more need for heated water in cold weather than in hot weather; or the water may need to be heated to a higher temperature).

If an extreme weather event is anticipated, the smart energy home hub 160 may charge the battery 140 in advance of the extreme weather event. Accordingly, should there be a loss of power from the AC electric grid 130, the power stored in the battery 140 may be fully (or mostly) charged. In such a case, the battery may be able to provide backup power to the smart energy home 100. If an extreme weather event is anticipated, the smart energy home hub 160 may prioritize delivery of electricity to either or both of the water boiler 172 and the HVAC unit 174.

As discussed above regarding FIG. 1, the smart home energy hub 160 may receive tariff information from the server 190. This tariff information may be used by the smart energy home hub 160 in regulating at least some of the smart energy home electricity use, such as by providing electricity to the grid at time of peak payment for such electricity, or by using generated solar electricity in the smart energy home 100 or charging the battery 140 at times when the cost of grid provided electricity is high. For example, if the cost of electricity is presently high, the smart home energy hub 160 may reduce amounts of electricity provided to the smart energy home devices 170 (e.g., while simultaneously providing an increased amount of electrical energy to the AC electric grid 130). In some instances, a price paid by an electric company for such electricity increases at times when demand is high on the AC electric grid 130. In some instances, electrical demand inside the smart energy home 100 increases, the smart home energy hub 160 may increase amounts of electricity provided to the smart energy home devices 170, while reducing the amount of electrical energy provided to the AC electric grid 130.

Since the smart energy home 100 monitors solar energy production by the PV panels 110a-110n, the smart energy home hub 160 may determine an amount of energy (e.g., irradiance) received by the plurality of PV panels. As such, the smart energy home hub 160 may, for example, control blinds or shades in the smart energy home 100, actuating control of the blinds based on one or more of energy received by the plurality of PV panels or an orientation of the smart home with respect to the sun. Furthermore, activation of smart energy home devices 170 in the smart energy home 100 may dynamically change according to an amount of solar energy that may be provided, potentially provided, or produced at a given time. For example, at times of low solar energy production, providing power to the boiler 172 may have a lower priority than providing power to the EV charger 150 (or vice-versa). At times of higher solar energy production, providing power to the boiler 172 may have a higher priority than providing power to the EV charger 150 (or vice-versa). As the amount of solar energy production fluctuates, priorities of smart energy home devices 170 to which power is provided may also fluctuate accordingly.

The smart home energy hub 160 may store memory information pertaining to demand for electricity over time both inside the smart energy home 100 and by the AC electric grid 130. Such information may be used heuristically to determine by the smart energy home hub 160, over time, a preferred time for operating particular smart energy home devices 170, providing energy to the EV charger 150, providing energy to the AC grid 130, or so forth. For example, the smart home energy hub 160 may heuristically determine that it is best if the EV charger 150 has completed charging the EV before 6:00 AM. Accordingly, the smart home energy hub 160 may heuristically determine an optimum pattern for providing electricity to the EV charger 150 during the night.

The smart home energy hub 160 may store a history of electricity consumption over time for at least one of the smart energy home devices 170. In the event of a deviation from an anticipated use of electricity (e.g., a use of substantially more or substantially less electricity than is anticipated or is typical) by the at least one of the smart energy home devices 170 on a basis of the stored history, the smart home energy hub 160 may trigger an alert of a deviation from an anticipated use of electricity by the at least one of the smart energy home devices 170 on a basis of the stored history. Such an alert may provide an early warning of a need to service the at least one of the smart energy home devices 170. In the event of a deviation from the anticipated use of electricity by the at least one of the smart energy home devices 170 on the basis of the stored history, the smart energy home hub 160 may allow a user of the smart energy home hub 160 to gradually or rapidly power down the at least one at least one of the smart energy home devices 170 (e.g., by an interface with the local controller 195A or the remote controller 195B).

The smart home energy hub 160 may regulate or control an amount of electrical current provided to chargers in the smart energy home 100 (e.g., other chargers besides the EV charger 150). The smart home energy hub 160 may limit internal power consumption (e.g., at appropriate times), and provide excess power to the AC grid 130. The smart home energy hub 160 may increases an amount of electrical power (e.g., at other appropriate times) provided for internal power consumption, and reduce the amount of electrical power provided to the AC grid 130.

The smart home energy hub 160 may modify distribution of electricity in the smart energy home 100 based, at least in part, on power consumption patterns inside the smart energy home 100. By way of example, the smart home energy hub 160 may modify a way in which electricity is shared among a plurality of loads (e.g. smart energy home devices 170 and other devices in the smart energy home 160) in the smart energy home 100. For example, during a particularly cold day or a particularly hot day, such as when power needs of the HVAC unit 174 are higher than normal, the smart home energy hub 160 may deliver less electrical power to other smart energy home devices 170. Accordingly, the smart home energy hub 160 may, for instance, decrease an amount of power delivered to one or more of the smart sockets 176.

The smart home energy hub 160 may optimize the electrical load in the smart energy home 100 by balancing the use and distribution of electricity in the smart energy home 100 on at least one phase in the smart energy home 100 electrical system. Control of power consumption across phases may enable compliance with regulatory limits set in local or jurisdictional codes to limit phase overload or reactive power. For example, a one-phase device on a three-phase grid may have a hard limit of 4.6 KW of power. The smart energy home hub 160 may be able, such as AV grid 130, to enable limits which can change depending on the loads on each phase. Home electrical systems may rely on three phase systems (one type of polyphase electrical grid systems). In a (typically symmetric) three phase electrical system, three conductors (e.g., electrical wires or cables) may each carry an AC current of the same frequency and voltage amplitude relative to a common reference, but with a phase difference of one third of a cycle between each other. It may happen that demands on one or more of the three phases become unbalanced, so that demand on one or two of the three phases may substantially exceed demand on the other one or two phases. In such a case, it may be desirable to perform phase balancing, where unbalanced loads are moved to other phases in the three phase electrical system. Additionally, as explained below, there may be jurisdictional or electrical code concerns that necessitate modifying usage of electricity from one phase, i.e., rebalancing the usage and or the demands on one phase by redistributing drawing of electrical power of all of the available phases.

In some aspects, each smart energy home devices 170 may have a multi-pole switch which may be remote controlled by smart home energy hub 160. Selecting a rebalance function from an interface to the smart home energy hub 160 may send a rebalance to message to the smart home energy hub 160. The smart home energy hub 160 may then communicate with the smart energy home devices 170, instructing the smart energy home devices 170 to draw power from different phases.

As an example of phase balancing by the smart home energy hub 160, in some jurisdictions (e.g., Germany) each line of a 3 phase house may be prohibited from surpassing 20 A. In other jurisdictions (e.g., Switzerland, Austria, and Denmark) each line of a 3 phase house may be prohibited from surpassing 16 A. The EV charger 150, may potentially be able to charge one phase at 32 A. Under the 20 A limit, however, the charger would be set to limit charging to no more than 20 A in order to avoid an overcurrent condition. For example, the smart energy home 100 may comprise the EV charger 150 on line 1 of three lines (e.g., one line per phase of the three phases in the smart energy home 100). Lines 2 and 3 may have other loads connected, e.g., a washing machine on line 2 at 10 A, and a TV, lights, or a radiator on line 3 at 6 amps. The overall 20 A limit of the EV charger 150 may now be increased to 26 A (20 A from line 1+a lowest of line 2 and 3) e.g., providing the EV charger 150 26 A instead of 20 A. This configuration may be monitored continuously and may change according to the loads. In an instance where rebalancing of phases becomes necessary, the smart energy home 160 may notify any one of or all of: a resident of the smart energy home 100, a maintenance worker or manager, an electrician, a technician, and so forth, that rebalancing of phases may be needed, in order that appropriate steps may be taken to ensure that the rebalancing occurs. E.g., an electrician may need to move certain appliances from circuitry associated with one phase in the smart energy home 100 to circuitry associated with a second phase in the smart energy home 100.

In some home PV systems (which may be the smart energy home 100), an installer of the PV panels 110a-110n system may define a maximum power in the home electrical system, for either or both safety or code (e.g., regulatory) reasons. Often, the power may be maintained below maximum current by limiting the current (i.e., the Amperage) due to the relationship that Power (W)=Current (A)*Voltage (V). For example, if there is a maximum current of 100 A, the AC grid 130 may provide a 100 A current. If the home PV system produces, on a given day, 60 A, then there may be a potential for 160 A on a bus bar in the smart energy home 100.

Some homes may provide two EV chargers (such as EV charger 150) in the smart energy home 100, thereby enabling charging two EVs 155 simultaneously. Each of the two EV chargers 150 may, for example, provide up to 40 A of current for charging an EV (such as EV 155), which may leave 20 A of the maximum current of 100 A for use in the smart energy home 100 (that is 40 A*2=80 A, leaving 100 A−80 A=20 A). The smart energy home hub 160 may limit the amount of current provided to the EV chargers 150, thereby increasing the amount of power available for use by other smart energy home devices 170. Furthermore, the smart energy home hub 160 may provide protection to the bus bar in the smart energy home 100 or avoid tripping circuit breakers by actively managing loads in the smart energy home 100.

Figure 2:
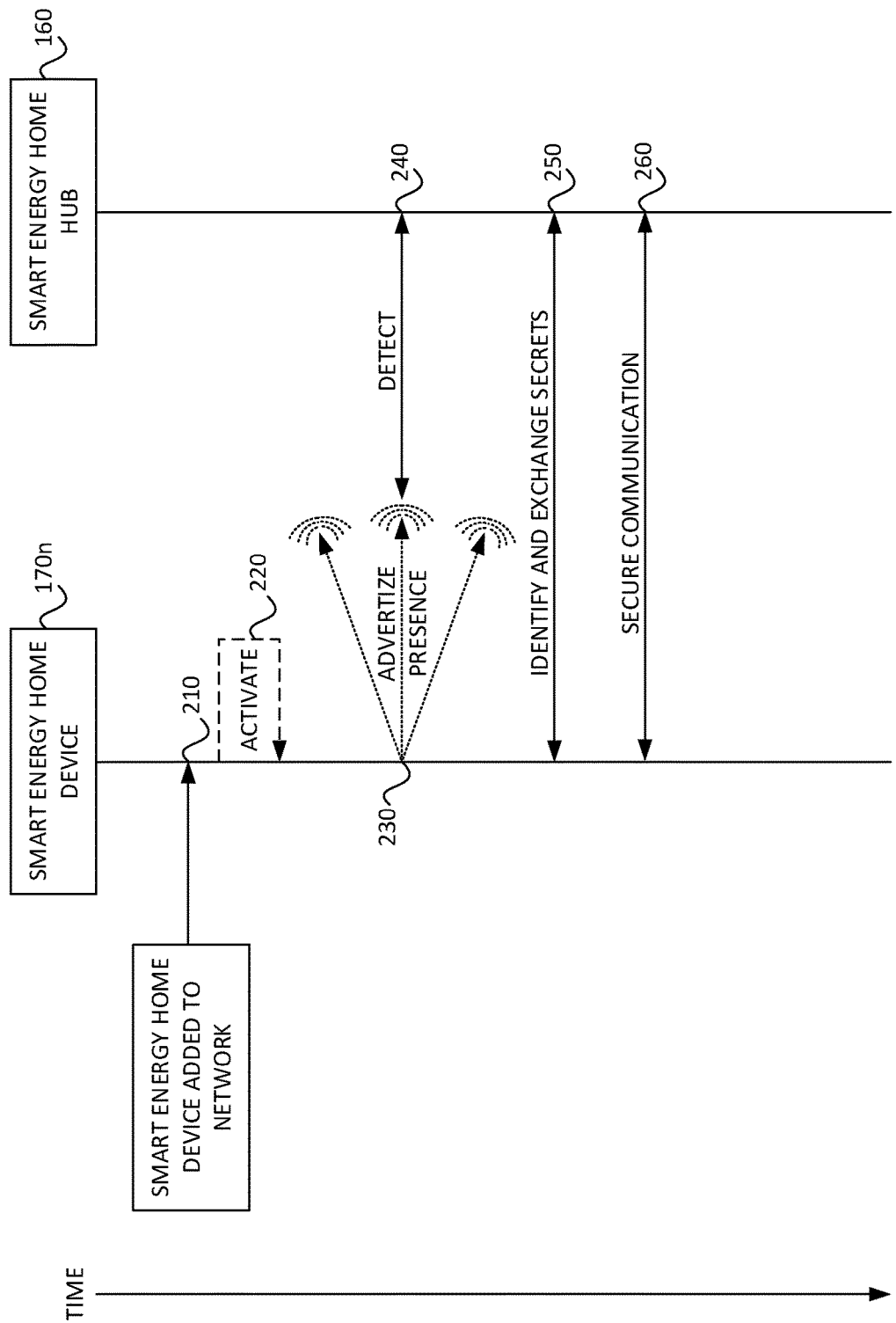
FIG. 2 shows an example data flow diagram of a procedure to register a device.

Reference is now made to FIG. 2, which is an example data flow diagram of a procedure for registering a device, such as the smart energy home device 170, on the smart energy home network with the smart energy home hub 160. Registering the smart energy home device 170 with the smart energy home hub 160 enables the smart energy home hub 160 to control the smart energy home device 170 such as may be described above, with reference to FIG. 1. It is appreciated that other appropriate protocols for registering the smart energy home device 170 on the smart energy home network with the smart energy home hub 160 may be utilized, and the protocol depicted in FIG. 2 is by way of example, and not to the exclusion of other protocols or steps which might be added, omitted, or performed differently than described below.

In step 210 a new smart energy home device 170n (which may be any home device 170) is added in an energy management domain which may define the smart energy home 100. Note that the energy management domain may extend outside of the physical boundaries of the walls of the smart energy home 100. For example, a garage door opener for a detached garage, a gate at a property or driveway boundary, outside lighting, a garden watering system, or so forth may all comprise examples of smart energy home devices 170 which may be in the energy management domain of the smart energy home device 170 and not within the walls of the smart energy home 100.

A network identification procedure may optionally be initiated (step 220) by an installer of the new smart energy home device 170n (who may be a resident of the smart energy home, or other person such as a professional installer). The installer may press a button, close a switch, or otherwise actuate a physical control on the new smart energy home device 170n, in order to indicate to both the new smart energy home device 170n and the smart energy home hub 160. This may indicate that the new smart energy home device 170n is now present and may be added to the smart energy home hub 160 network. In some instances, the installer may be a specialized robot. For example, a robot with the ability to gently grip objects, twist objects, and sense objects, as well as to navigate to (and from) a light bulb socket, may install a smart light bulb.

In step 230, the new smart energy home device 170n may begin to advertise its presence on the smart energy home hub 160 network after the new smart energy home device 170n is connected to a supply of energy. For example, when the new smart energy home device 170n is plugged into an electric socket (e.g., and it detects the presence of the smart energy home hub 160 network), it may begin to identify itself on the network such as by: using Link Layer Discovery Protocol (LLDP), sending a plurality of ping packets, sending a "Here I Am" packet, sending an SNMP discovery packet or other appropriate packet, or so forth. The method of discovery may conform to protocols of the Transmission Control Protocol (TCP) and/or Internet Protocol (IP) package the new smart energy home device 170n is equipped to execute.

When the new smart energy home device 170n and the smart energy home hub 160 detect one another's presence (step 240), the new smart energy home device 170n and the smart energy home hub 160 may identify one another and exchange secret information (step 250). For example, the secret information may include one or more random or pseudo-random numbers or one or more public keys (e.g., at least one public key for each one of the new smart energy home device 170n and the smart energy home hub 160). Device identification information, which may include a manufacturer ID, a device serial number, device energy needs and tolerances, or so forth) may also be exchanged. The new smart energy home device 170n and the smart energy home hub 160 may exchange security certificates. (E.g., when an asymmetric cryptographic protocol is to be implemented) key exchange material (such as in the Diffie-Helman key exchange routine) may be exchanged.

Communication between the new smart energy home device 170n and the smart energy home hub 160 may then commence in a secure fashion (step 260). If communications are to be performed without invoking secure communications, some or all of the above steps may be omitted.

Figure 3:
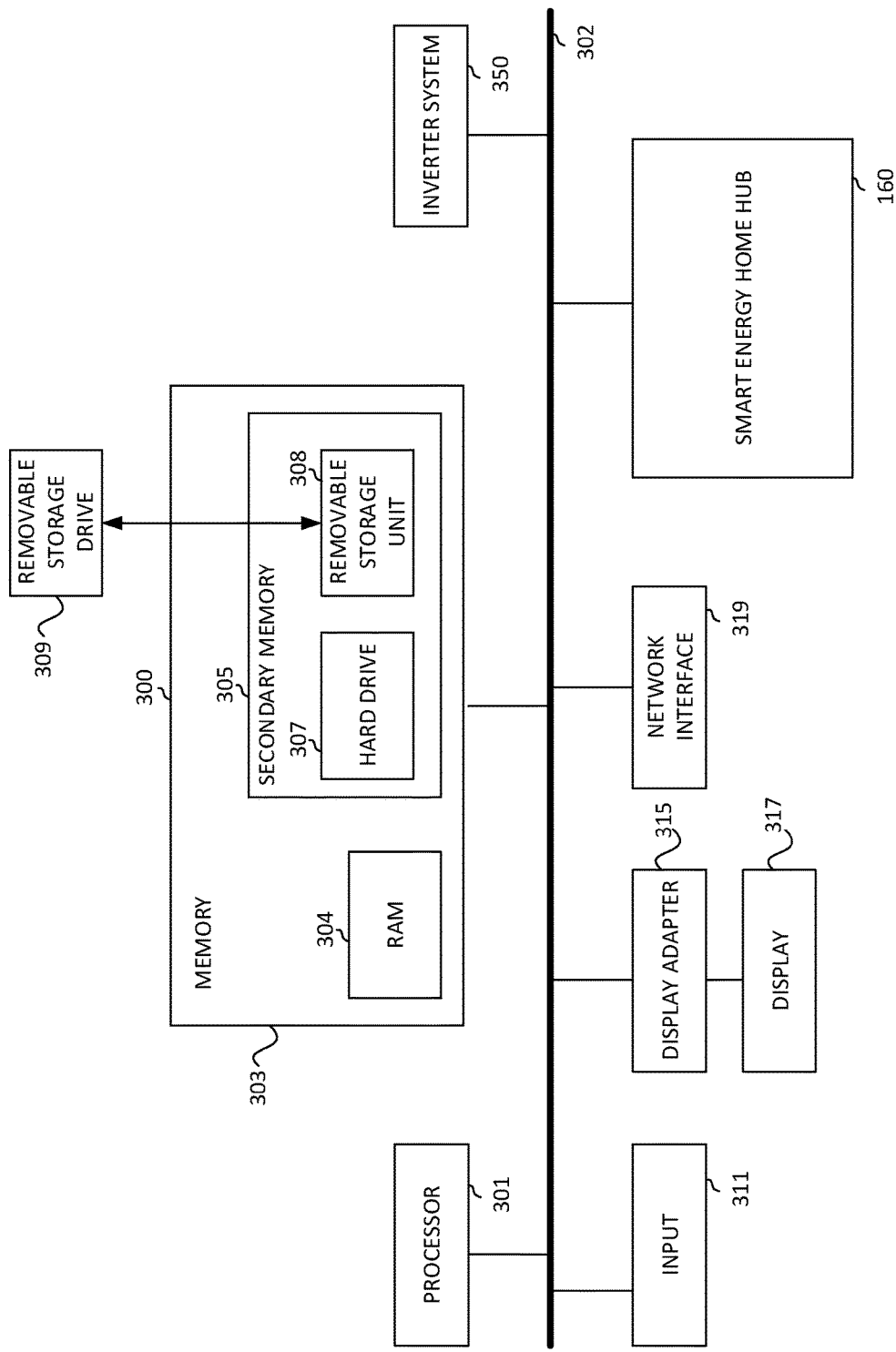
FIG. 3 shows an example block diagram of an architecture for an inverter-based smart energy home hub.

Reference is now made to FIG. 3, which is a block diagram of an example architecture of an inverter-based smart energy home hub 300 comprising the smart energy home hub 160. The inverter based smart energy home hub 300 may be suitable for implementing any of the systems, methods or processes described above. The inverter based smart energy home hub 300 may comprise one or more processors, such as processor 301, providing an execution platform for executing machine-readable instructions such as software. One of the processors 301 may be a special purpose processor operative for executing the operations of the smart energy home hub 160 as described herein above.

Commands and data from the processor 301 may be communicated over a communication bus 302. The inverter based smart energy home hub 300 may include a main memory 303, such as a Random Access Memory (RAM) 304, where machine readable instructions may reside during runtime, and a secondary memory 305. The secondary memory 305 may include, for example, a hard disk drive 307 and/or a removable storage drive 308 (which may be not generally accessible on a regular basis, but possibly accessible by service personnel or installers, etc.), such as a floppy diskette drive, a magnetic tape drive, a compact disk drive, a flash drive, etc., or a nonvolatile memory where a copy of the machine readable instructions or software may be stored. The secondary memory 305 may also include ROM (read only memory), EPROM (erasable, programmable ROM), EEPROM (electrically erasable, programmable ROM). In addition to software, data relevant to the operation of the smart energy home, such as various historical data regarding past operations of the smart energy home hub 160 as described herein above, or other similar data may be stored in the main memory 303 or the secondary memory 305. The removable storage drive 308 may read from or write to a removable storage unit 309.

A user may interface with the inverter based smart energy home hub 300 via the user interface which includes input devices 311, such as a touch screen, a keyboard, a mouse, a stylus, and the like, as well as interfaces for input via the wireless interface, in order to provide user input data or other commands. A display adaptor 315 interfaces with the communication bus 302 and a display 317 and receives display data from the processor 301 and converts the display data into display commands for the display 317.

A network interface 319 is provided for communicating with other systems and devices via a network (such as a wireless network in the smart energy home 100, as discussed above with reference to FIG. 1). The network interface 319 typically includes a wireless interface for communicating with wireless devices in the wireless community. A wired network interface (an Ethernet interface, by way of example) may be present as well. The inverter based smart energy home hub 300 may also comprise other interfaces, including, but not limited to Bluetooth or High-Definition Multimedia Interface (HDMI).

The inverter system 350 may communicate with the other apparatus described herein as the inverter based smart energy home hub 300 via the communications bus 302.

The user may interact with the local controller 195A or the remote controller 195B which communicate with the inverter based smart energy home hub 300 via the input devices 311 and the display 317.

It is appreciated that one or more of the above-described components of the inverter based smart energy home hub 300 may not be included in the inverter based smart energy home hub 300, or other components may be added. The inverter based smart energy home hub 300 shown in FIG. 3 is provided as an example of a possible platform that may be used, and other appropriate types of platforms may be used as alternative platforms. One or more of the steps described above may be implemented as instructions embedded on a computer readable medium and executed on the inverter based smart energy home hub 300. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), or magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM, on a flash drive, or via Internet download. In a sense, the Internet itself, as an abstract entity, is a computer readable medium. The same is true of computer networks in general. It is therefore to be understood that those functions enumerated above may be performed by any electronic device capable of executing the above-described functions.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A smart energy hub, installed at a residence, the smart energy hub comprising:
    a first terminal connected to one or more power sources, wherein the one or more power sources include a plurality of photovoltaic (PV) panels electrically connected to an inverter, and wherein the inverter converts direct current (DC) electricity from the PV panels into alternating current (AC) electricity;
    a second terminal connected to one or more smart energy devices, wherein the one or more smart energy devices are operated by AC electricity; and
    one or more processors and memory storing instructions that, when executed by the one or more processors, cause the smart energy hub to:
        determine a first amount of AC power drawn from the inverter by the one or more smart energy devices;
        determine a second amount of AC power supplied, from an electric grid, to the one or more smart energy devices;
        determine a demand for electricity over time, based on the first AC power and the second AC power;
        identify power consumption patterns of at least one user;
        receive weather information related to an upcoming anticipated weather condition;
        charge a battery, using the plurality of PV panels, based on the upcoming anticipated weather condition indicating an extreme weather event; and
        modify distribution of electricity in the residence based, at least in part, on the power consumption patterns of the at least one user and the weather information.

2. The smart energy hub of claim 1, wherein the smart energy hub is a smart energy home hub, and wherein the one or more smart energy devices are one or more smart energy home devices.

3. The smart energy hub of claim 1, wherein one or more processors are configured to configure the inverter to store electrical energy generated by the plurality of PV panels in a battery.

4. The smart energy hub of claim 1, wherein the one or more processors are configured to modify an amount of power provided to a battery.

5. The smart energy hub of claim 2, wherein the one or more processors are configured to determine one of:
an amount of electrical energy stored in a battery; or
an amount of power provided to a battery.

6. The smart energy hub of claim 5, wherein the smart energy home hub receives information related to electrical tariffs, and wherein the one or more processors are configured to control at least one of the one or more smart energy devices in response to the information related to electrical tariffs.

7. The smart energy hub of claim 2, wherein the one or more processors are further configured to determine a presence of at least one user in the residence wherein the residence is shared by a plurality of users.

8. The smart energy hub of claim 7, wherein for the anticipated weather condition, the one or more processors are configured to prioritize delivery of electricity to one or more specific devices.

9. The smart energy hub of claim 1, wherein the one or more processors are configured to control an electrical vehicle (EV) charger connected to the inverter.

10. The smart energy hub of claim 9, wherein the second amount of AC power is provided to the EV charger on the basis of one or more of:
electrical tariffs,
current weather,
anticipated weather,
current production levels of electricity in the smart energy hub,
anticipated production levels of electricity in the smart energy hub,
current electrical demand of at least one of the one or more smart energy devices or the smart energy hub, or
anticipated electrical demand of at least one of the one or more smart energy devices or the smart energy hub.

11. The smart energy hub of claim 1, wherein the one or more processors are configured to control phase balancing in the smart energy hub.

12. The smart energy hub of claim 1, wherein the one or more processors are configured to modify distribution of electricity in the smart energy hub based, at least in part, on power consumption patterns inside the smart energy hub.

13. The smart energy hub of claim 1, wherein the one or more processors are configured to provide AC electricity to the electric grid.

14. The smart energy hub of claim 1, wherein the smart energy hub comprises a communication port for communication with the one or more smart energy devices.

15. The smart energy hub of claim 14, wherein the one or more processors are configured to communicate, via the communication port, using encrypted communication.

16. The smart energy hub of claim 1, wherein two or more smart energy devices connect to each other as a mesh network.

17. The smart energy hub of claim 1, wherein the one or more processors are configured to exercise control of the one or more smart energy devices based on one or more of:
irradiance received by the plurality of PV panels, or
an orientation of the smart energy hub.

18. The smart energy hub of claim 1, wherein the one or more processors are configured to store a history of electricity consumption over time by at least one of the one or more smart energy devices.

19. The smart energy hub of claim 18, wherein the one or more processors are configured to trigger an alert in an event of a deviation from an anticipated use of electricity, based on a history of electricity consumption over time by the at least one of the one or more smart energy devices.

20. The smart energy hub of claim 1, wherein the one or more processors are further configured to supply a third AC power, from the inverter, to the one or more smart energy devices.

* * * * *